(12) United States Patent
Huang et al.

(10) Patent No.: US 9,690,342 B2
(45) Date of Patent: *Jun. 27, 2017

(54) COMPUTER SYSTEM AND POWER CIRCUIT THEREFOR

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Yong-Zhao Huang, Wuhan (CN); Jin-Liang Xiong, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 266 days.

This patent is subject to a terminal disclaimer.

(21) Appl. No.: 14/569,286

(22) Filed: Dec. 12, 2014

(65) Prior Publication Data

US 2016/0132087 A1     May 12, 2016

(30) Foreign Application Priority Data

Nov. 6, 2014  (CN) .......................... 2014 1 0618741

(51) Int. Cl.
*G06F 1/26*     (2006.01)

(52) U.S. Cl.
CPC ...................................... *G06F 1/26* (2013.01)

(58) Field of Classification Search
None
See application file for complete search history.

(56) References Cited

U.S. PATENT DOCUMENTS

| | | | |
|---|---|---|---|
| 2008/0162950 A1* | 7/2008 | Brown | G06F 1/3203 713/300 |
| 2009/0125733 A1* | 5/2009 | Lin | G06F 1/266 713/310 |
| 2009/0307382 A1* | 12/2009 | Chan | G06F 13/4081 710/16 |

* cited by examiner

*Primary Examiner* — Kim Huynh
*Assistant Examiner* — Paul J Yen
(74) *Attorney, Agent, or Firm* — Steven Reiss

(57) ABSTRACT

A computer system includes a display, a motherboard and a power circuit. The display includes a video interface. The motherboard includes a super input-output (SIO) chip. The power circuit includes a first switch unit, a second switch unit, a third switch unit, and an oscillator. When the display is powered on, the video interface outputs a high level signal, the first switch unit is turned on, a power supply powers the oscillator through the first switch unit. The oscillator operates and outputs a high level signal, the second switch unit is turned on, a power-on signal pin of the SIO chip receives a low level signal, and the motherboard is turned on.

10 Claims, 2 Drawing Sheets

COMPUTER SYSTEM AND POWER CIRCUIT THEREFOR

FIELD

The subject matter herein generally relates to computer systems, and particularly to a computer system with a power circuit.

BACKGROUND

Each desktop computer includes a power button on a front panel of a chassis. However, most chassis are generally placed under computer desks. To power on the desktop computer, one needs to bend over to press the power button, which is very inconvenient.

BRIEF DESCRIPTION OF THE DRAWINGS

Implementations of the present technology will now be described, by way of example only, with reference to the attached figures.

DETAILED DESCRIPTION

Figure 1:
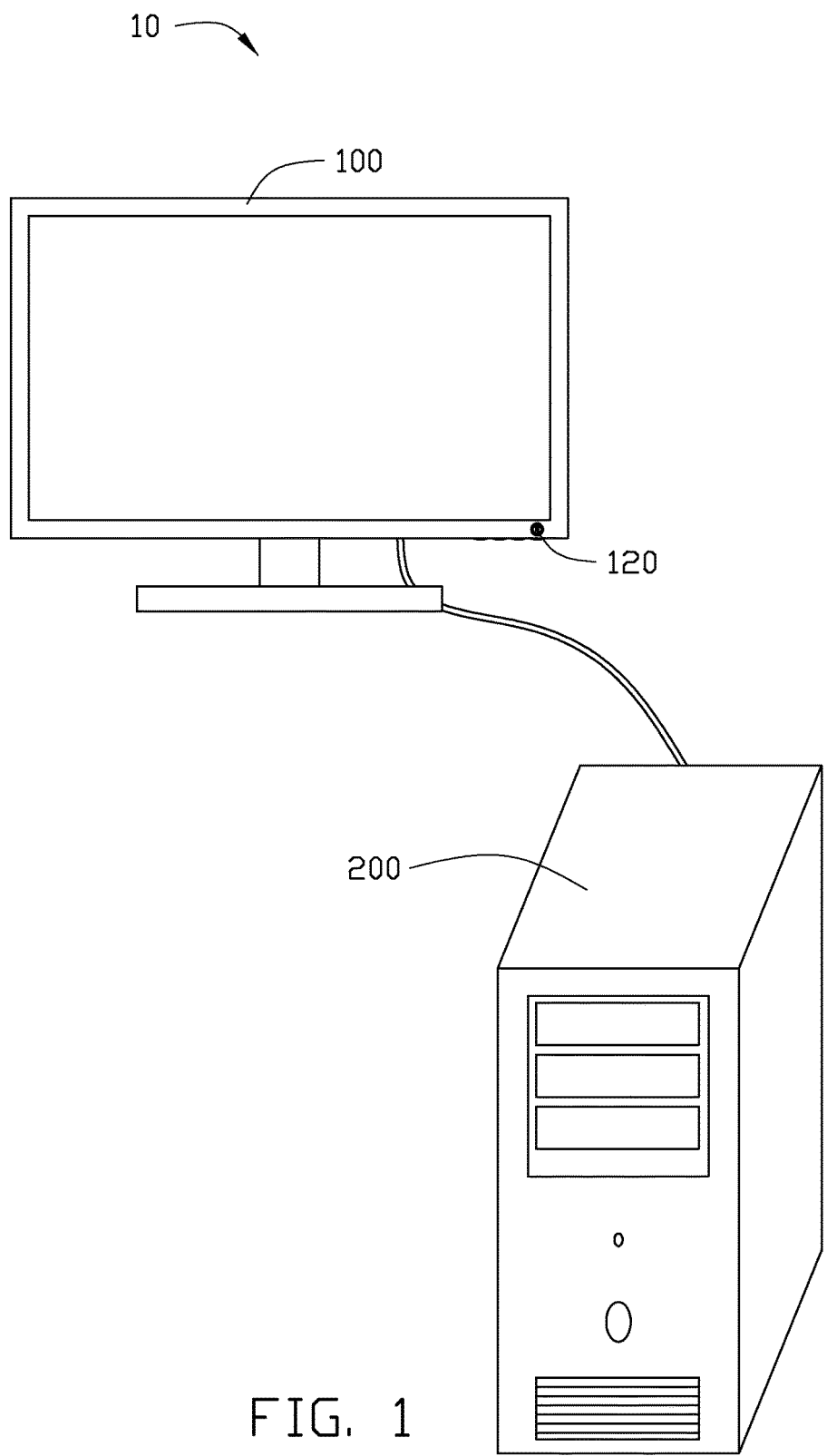
FIG. 1 is a diagrammatic view of a computer system comprising a power circuit.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

Figure 2:
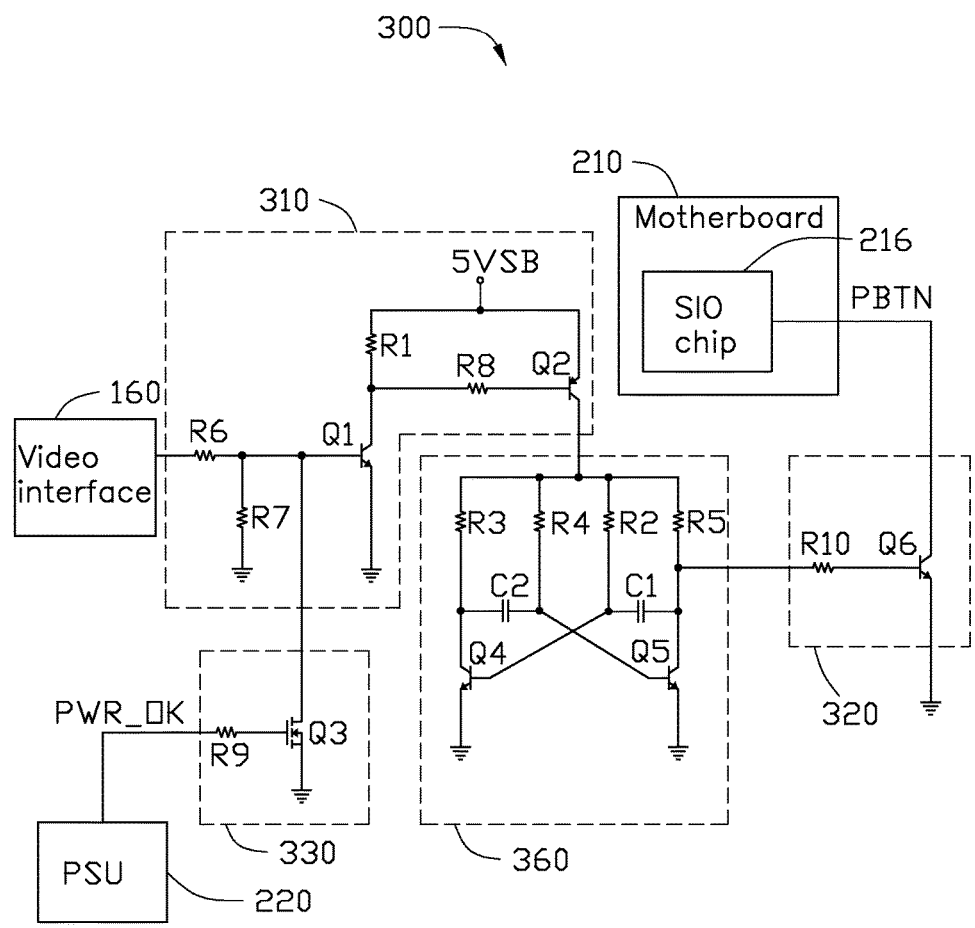
FIG. 2 is a circuit diagram of the power circuit of FIG. 1.

FIGS. 1 and 2 illustrate an embodiment of a computer system 10. The computer system 10 can comprise a display 100, a host computer 200 electrically coupled to the display 100, and a power circuit 300. The display 100 can comprise a power button 120 and a video interface 160. The host computer 200 can comprise a motherboard 210 and a power supply unit (PSU) 220 to power the motherboard 210. The motherboard 210 can comprise a super input-output (SIO) chip 216. The power circuit 300 can comprise a first switch unit 310, a second switch unit 320, a third switch unit 330, and an oscillator 360.

The first switch unit 310 can comprise a first electronic switch Q1, a second electronic switch Q2, and four resistors R1 and R6-R8. Each of the first electronic switch Q1 and the second electronic switch Q2 can comprise a first terminal, a second terminal, and a third terminal. The first terminal of the first electronic switch Q1 is electrically coupled to the video interface 160 through the resistor R6, and is electrically coupled to a ground through the resistor R7. The second terminal of the first electronic switch Q1 is electrically coupled to a power supply 5VSB through the resistor R1. The third terminal of the first electronic switch Q1 is electrically coupled to the ground. The first terminal of the second electronic switch Q2 is electrically coupled to the second terminal of the first electronic switch Q1 through the resistor R8. The second terminal of the second electronic switch Q2 is electrically coupled to the oscillator 360. The third terminal of the second electronic switch Q2 is electrically coupled to the power supply 5VSB.

The third switch unit 330 can comprise a third electronic switch Q3 and a resistor R9. The third electronic switch Q3 can comprise a first terminal, a second terminal, and a third terminal. The first terminal of the third electronic switch Q3 is electrically coupled to the PSU 220 through the resistor R9, to receive a power-good signal PWR_OK from the PSU 220. The second terminal of the third electronic switch Q3 is electrically coupled to the first terminal of the first electronic switch Q1. The third terminal of the third electronic switch Q3 is electrically coupled to the ground.

The oscillator 360 can comprise a fourth electronic switch Q4, a fifth electronic switch Q5, two capacitors C1 and C2, and four resistors R2-R5. Each of the fourth electronic switch Q4 and the fifth electronic switch Q5 can comprise a first terminal, a second terminal, and a third terminal. The first terminal of the fourth electronic switch Q4 is electrically coupled to the second switch unit 320 through the capacitor C1, and is electrically coupled to the second terminal of the second electronic switch Q2 through the resistor R2. The second terminal of the fourth electronic switch Q4 is electrically coupled to the second terminal of the second electronic switch Q2 through the resistor R3. The third terminal of the fourth electronic switch Q4 is electrically coupled to the ground. The first terminal of the fifth electronic switch Q5 is electrically coupled to the second terminal of the fourth electronic switch Q4 through the capacitor C2, and is electrically coupled to the second terminal of the second electronic switch Q2 through the resistor R4. The second terminal of the fifth electronic switch Q5 is electrically coupled to the second switch unit 320, and is electrically coupled to the second terminal of the second electronic switch Q2 through the resistor R5. The third terminal of the fifth electronic switch Q5 is electrically coupled to the ground.

The second switch unit 320 can comprise a sixth electronic switch Q6 and a resistor R10. The sixth electronic switch Q6 can comprise a first terminal, a second terminal, and a third terminal. The first terminal of the sixth electronic switch Q6 is electrically coupled to the second terminal of the fifth electronic switch Q5 through the resistor R10. The second terminal of the sixth electronic switch Q6 is electrically coupled to a power-on signal pin PBTN of the SIO chip 216. The third terminal of the sixth electronic switch Q6 is electrically coupled to the ground.

When the motherboard 210 is in a turned off state, the power-good signal PWR_OK output from the PSU 220 is at a low level, such as logic 0, the third electronic switch Q3 is turned off. When the power button 120 is pressed to turn on the display 100, the video interface 160 outputs a high level signal, such as logic 1, to turn on the first electronic switch Q1. The second electronic switch Q2 is turned on. The power supply 5VSB supplies power to the oscillator 360 through the second electronic switch Q2. The oscillator 360 operates and outputs a periodic pulse signal. When the pulse signal output from the oscillator 360 is at a high level, the sixth electronic switch Q6 is turned on, the power-on signal pin PBTN of the SIO chip 216 receives a low level signal from the sixth electronic switch Q6, and the motherboard 30 is turned on.

When the motherboard 210 is turned on, the power-good signal PWR_OK outputted from the PSU 220 turns to a high level. The third electronic switch Q3 is turned on, the first electronic switch Q1 is turned off, the second electronic switch Q2 is turned off, the oscillator 360 is not powered on and does not operate, and the sixth electronic switch Q6 is turned off. The power-on signal pin PBTN of the SIO chip 216 receives a high level signal, and the motherboard 210 begins to operate.

When the display 100 is in a turned off state and the motherboard 210 is in the turned off state, the video interface 160 outputs a low level signal, and the power-good signal PWR_OK output from the PSU 220 is at a low level. The first electronic switch Q1 is turned off, the second electronic switch Q2 is turned off, the third electronic switch Q3 is turned off, the oscillator 360 is not powered and does not operate, and the sixth electronic switch Q6 is turned off. The power-on signal pin PBTN of the SIO chip 216 receives a high level signal, and the motherboard 210 maintains the turned off state.

In at least one embodiment, each of the first electronic switch Q1, the fourth electronic switch Q4, the fifth electronic switch Q5 and the sixth electronic switch Q6 can be an npn-type bipolar junction transistor (BJT), and the first terminal, the second terminal, and the third terminal of each of the first electronic switch Q1, the fourth electronic switch Q4, the fifth electronic switch Q5 and the sixth electronic switch Q6 correspond to a base, a collector, and an emitter of the npn-type BJT, respectively. The second electronic switch Q2 can be a pnp-type BJT, and the first terminal, the second terminal, and the third terminal of the second electronic switch Q2 correspond to a base, a collector, and an emitter of the pnp-type BJT, respectively. The third electronic switch Q3 can be an n-channel metal-oxide semiconductor field-effect transistor (NMOSFET), and the first terminal, the second terminal, and the third terminal of the third electronic switch Q3 correspond to a gate, a drain, and a source of the NMOSFET, respectively. In other embodiments, each of the first electronic switch Q1, the fourth electronic switch Q4, the fifth electronic switch Q5 and the sixth electronic switch Q6 can be an NMOSFET or other suitable switch having similar functions. The second electronic switch Q2 can be a p-channel metal-oxide semiconductor field-effect transistor (PMOSFET) or other suitable switch having similar functions. The third electronic switch Q3 can be an npn-type BJT or other suitable switch having similar functions.

In at least one embodiment, the display 100 is turned on by pressing the power button 120. The video interface 160 can be a video graphics array interface, a digital visual interface, a high definition multimedia interface, a DisplayPort, or other suitable interface can transmit video signal. The power circuit 300 is used to power on the motherboard 210 when the display 100 is turned on. In other embodiments, the display 100 can be turned on by a remote control device. The power circuit 300 can be used to power on other electronic devices.

The embodiments shown and described above are only examples. Many details are often found in the art such as the other features of a computer system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A computer system comprising:
    a display comprising a video interface;
    a motherboard comprising a super input-output (SIO) chip comprising a power-on signal pin;
    a power supply unit (PSU) configured to generate a power-good signal; and
    a power circuit comprising:
        a first switch unit electrically coupled to the video interface and a power supply;
        a second switch unit electrically coupled to the power-on signal pin;
        a third switch unit electrically coupled to the first switch unit, and electrically coupled to the PSU and configured to receive the power-good signal; and
        an oscillator electrically coupled to the first switch unit and the second switch unit;
    the computer system configured such that, in response to the display being turned on, the video interface outputs a high level signal to turn on the first switch unit, the power supply powers the oscillator through the first switch unit, the oscillator operates and outputs a high level signal to turn on the second switch unit, the power-on signal pin of the SIO chip receives a low level signal, the motherboard is turned on, the power-good signal outputted from the PSU turns to a high level, the third switch unit is turned on, the first switch unit is turned off, the oscillator does not operate, the second switch is turned off, the power-on signal pin of the SIO chip receives a high level signal, and the motherboard operates.

2. The computer system of claim 1, wherein the first switch unit comprises:
    a first resistor;
    a first electronic switch comprising a first terminal electrically coupled to the video interface, a second terminal electrically coupled to the power supply through the first resistor, and a third terminal electrically coupled to a ground; and
    a second electronic switch comprising a first terminal electrically coupled to the second terminal of the first electronic switch, a second terminal electrically coupled to the oscillator, and a third terminal electrically coupled to the power supply;
    wherein in response to the video interface outputting the high level signal, the first electronic switch is turned on, the second electronic switch is turned on, and the power supply powers the oscillator through the second electronic switch.

3. The computer system of claim 2, wherein the third switch unit comprises a third electronic switch, the third electronic switch comprises a first terminal electrically coupled to the PSU to receive the power-good signal, a second terminal electrically coupled to the first terminal of the first electronic switch, and a third terminal electrically coupled to the ground; and wherein in response to the power-good signal turning to a high level, the third electronic switch is turned on, the first electronic switch is turned off, and the second electronic switch is turned off.

4. The computer system of claim 1, wherein the oscillator comprises:
   a second resistor, a third resistor, a fourth resistor, and a fifth resistor;
   a first capacitor and a second capacitor;
   a fourth electronic switch comprising a first terminal electrically coupled to the first switch unit through the second resistor, and electrically coupled to the second switch unit through the first capacitor, a second terminal electrically coupled to the first switch unit through the third resistor, and a third terminal electrically coupled to the ground; and
   a fifth electronic switch comprising a first terminal electrically coupled to the second terminal of the fourth electronic switch through the second capacitor, and electrically coupled to the first switch unit through the fourth resistor, a second terminal electrically coupled to the second switch unit, and electrically coupled to the first switch unit through the fifth resistor, and a third terminal electrically coupled to the ground.

5. The computer system of claim 1, wherein the second switch unit comprises a sixth electronic switch, the sixth electronic switch comprises a first terminal electrically coupled to the oscillator, a second terminal electrically coupled to the power-on signal pin of the SIO chip, and a third terminal electrically coupled to a ground; wherein in response to the oscillator outputting the high level signal to the first terminal of the sixth electronic switch, the sixth electronic switch is turned on, the power-on signal pin of the SIO chip receives the low level signal; and wherein in response to the oscillator not operating, the sixth electronic switch is turned off, the power-on signal pin of the SIO chip receives the high level signal.

6. A power circuit, comprising:
   an oscillator;
   a first switch unit comprising a first input terminal to receive a first signal, a second input terminal electrically coupled to a power supply, and an output terminal electrically coupled to the oscillator;
   a second switch unit comprising an input terminal electrically coupled to the oscillator, and an output terminal to output a second signal; and
   a third switch unit comprising an input terminal to receive a third signal, and an output terminal electrically coupled to the first switch unit;
   wherein in response to the first signal being at a high level, the first switch unit is turned on, the power supply powers the oscillator through the first switch unit, the oscillator operates and outputs a high level signal to the input terminal of the second switch unit, the second switch unit is turned on, and the second signal is at a low level; and
   wherein in response to the third signal being at a high level, the third switch unit is turned on, the first switch unit is turned off, the oscillator does not operate, the second switch unit is turned off, and the second signal is at a high level.

7. The power circuit of claim 6, wherein the first switch unit comprises:
   a first resistor;
   a first electronic switch comprising a first terminal functioning as the first input terminal of the first switch unit to receive the first signal, a second terminal electrically coupled to the power supply through the first resistor, and a third terminal electrically coupled to a ground; and
   a second electronic switch comprising a first terminal electrically coupled to the second terminal of the first electronic switch, a second terminal functioning as the output terminal of the first switch unit electrically coupled to the oscillator, a third terminal functioning as the second input terminal of the first switch unit electrically coupled to the power supply;
   wherein in response to the first signal being at the high level, the first electronic switch is turned on, the second electronic switch is turned on, and the power supply powers the oscillator through the second electronic switch.

8. The power circuit of claim 7, wherein the third switch unit comprises a third electronic switch, the third electronic switch comprises a first terminal functioning as the input terminal of the third switch unit to receive the third signal, a second terminal functioning as the output terminal of the third switch unit electrically coupled to the first terminal of the first electronic switch, and a third terminal electrically coupled to the ground; and wherein in response to the third signal being at the high level, the third electronic switch is turned on, the first electronic switch is turned off, and the second electronic switch is turned off.

9. The power circuit of claim 6, wherein the oscillator comprises:
   a second resistor, a third resistor, a fourth resistor, and a fifth resistor;
   a first capacitor and a second capacitor;
   a fourth electronic switch comprising a first terminal electrically coupled to the output terminal of the first switch unit through the second resistor, and electrically coupled to the input terminal of the second switch unit through the first capacitor, a second terminal electrically coupled to the output terminal of the first switch unit through the third resistor, and a third terminal electrically coupled to the ground; and
   a fifth electronic switch comprising a first terminal electrically coupled to the second terminal of the fourth electronic switch through the second capacitor, and electrically coupled to the output terminal of the first switch unit through the fourth resistor, a second terminal electrically coupled to the input terminal of the second switch unit, and electrically coupled to the output terminal of the first switch unit through the fifth resistor, and a third terminal electrically coupled to the ground.

10. The power circuit of claim 6, wherein the second switch unit comprises a sixth electronic switch, the sixth electronic switch comprises a first terminal functioning as the input terminal of the second switch unit electrically coupled to the oscillator, a second terminal functioning as the output terminal of the second switch unit to output the second signal, and a third terminal electrically coupled to a ground; wherein in response to the oscillator outputting the high level signal to the first terminal of the sixth electronic switch, the sixth electronic switch is turned on, and the second signal is at the low level; and wherein in response to the oscillator not operating, the sixth electronic switch is turned off, and the second signal is at the high level.

* * * * *